PULSE RESYNCHRONIZING SYSTEM FOR CONVERTING ASYNCHRONOUS, RANDOM LENGTH DATA SIGNAL INTO DATA SIGNAL SYNCHRONOUS WITH CLOCK SIGNAL

Filed June 4, 1963 4 Sheets-Sheet 1

INVENTOR
ROBERT E. McCANN
BY Cushman, Darby & Cushman
ATTORNEYS

INVENTOR
ROBERT E. McCANN

BY Cushman, Darby & Cushman
ATTORNEYS

Dec. 21, 1965 R. E. McCANN 3,225,301

PULSE RESYNCHRONIZING SYSTEM FOR CONVERTING ASYNCHRONOUS, RANDOM LENGTH DATA SIGNAL INTO DATA SIGNAL SYNCHRONOUS WITH CLOCK SIGNAL

Filed June 4, 1963 4 Sheets-Sheet 3

INVENTOR
ROBERT E. McCANN

BY Cushman, Darby & Cushman
ATTORNEYS

PULSE RESYNCHRONIZING SYSTEM FOR CONVERTING ASYNCHRONOUS, RANDOM LENGTH DATA SIGNAL INTO DATA SIGNAL SYNCHRONOUS WITH CLOCK SIGNAL

Filed June 4, 1963 4 Sheets-Sheet 4

INVENTOR
ROBERT E. McCANN

BY Cushman, Darby & Cushman
ATTORNEYS 3,225,301
Patented Dec. 21, 1965

3,225,301

PULSE RESYNCHRONIZING SYSTEM FOR CONVERTING ASYNCHRONOUS, RANDOM LENGTH DATA SIGNAL INTO DATA SIGNAL SYNCHRONOUS WITH CLOCK SIGNAL

Robert E. McCann, Minneapolis, Minn., assignor to Control Data Corporation, Minneapolis, Minn., a corporation of Minnesota Filed June 4, 1963, Ser. No. 285,492
7 Claims. (Cl. 328—63)

This invention relates to a resynchronizing system for a data processing machine and more particularly to an arrangement for converting an asynchronous data input signal of random length into a data signal which is synchronous with the clock signal of the machine.

In known resynchronizing systems it has been the practice to use resynchronizing circuits having the same speed of operation as the building blocks of the data system itself. In such systems it is therefore necessary to allow several clock cycles to insure that the presence or absence of an input to the system is fully resolved.

This invention provides an improved resynchronizing system capable of resolving an asynchronous data input signal of random length in less than one-half of a clock cycle thereby enabling resynchronization of the data signal to occur in a maximum of one and a half clock cycles.

Another object is to provide a high speed circuit arrangement operating faster than the building blocks of the data processing system.

A further object is to provide a logic arrangement for the resynchronizing circuit which insures that resynchronized data signal has a phase time equal to that of the clock signal.

Further objects and the entire scope of the invention will become more fully apparent when considered in light of the following detailed description of an illustrative embodiment of the invention and from the appended claims.

The illustrative embodiment may be best understood by reference to the accompanying drawings wherein.

Briefly, the invention comprises a logical arrangement wherein a random input signal is applied to an inverter, delay line and gating arrangement to produce a pulse having a length corresponding to the time delay of the delay line. This pulse sets a first flip-flop. The information on the SET line of the first flip-flop is gated with a half period of an inverted clock signal to the SET input line of a second flip-flop. When the second flip-flop is SET, the output on the SET line is simultaneously gated with a half period clock signal to produce a resynchronized output and a CLEARING signal for the first flip-flop. The second flip-flop is then CLEARED to prevent a further output signal from being generated.

Figure 1:
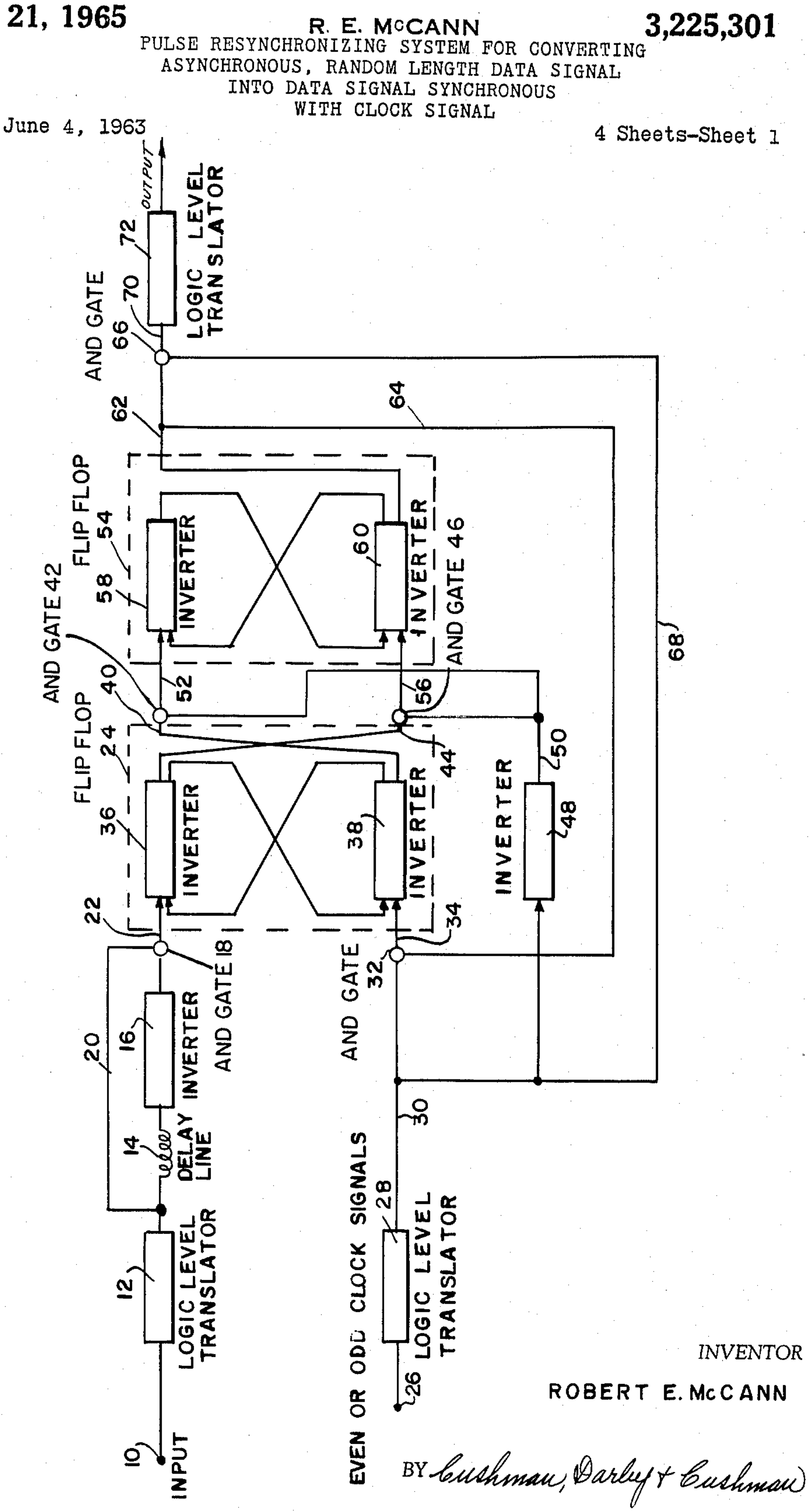
FIGURE 1 is a block diagram of the disclosed resynchronizing system.

In FIGURE 1 there is illustrated a schematic block diagram of the resynchronizing circuit of the invention. This circuit includes an input terminal 10 to which asynchronous signals of random length are applied. Terminal 10 is connected to a logic level translator 12. This translator converts the external digital logic level of the asynchronous signals to internal logic levels utilized by the resynchronizing circuit. Connected in series with the output terminal of logic level translator 12 are a delay line 14 and an inverter 16. The output of inverter 16 is connected as one input to an AND gate 18. A line 20 is joined between the output of translator 12 and a second input terminal of AND gate 18. The output line 22 of AND gate 18 serves as the SET input line of a bistable multivibrator, or flip-flop, 24. To a second input terminal 26 of the resynchronizing circuit are applied even or odd clock signals. Terminal 26 is connected to a logic level translator 28 which functions similarly to translator 12 in converting the external digital logic level of the clock signals to the internal logic levels as utilized by the resynchronizing circuit. The output of translator 28 is connected by line 30 to one input terminal of an AND gate 32. The output line 34 from gate 32 serves as the CLEAR input line of flip-flop 24. The flip-flop 24 comprises a pair of inverters 36 and 38 having cross-coupled feedback paths. This type of bistable device is fully described in application Serial No. 233,778, filed on October 29, 1962, now Patent 3,165,584 by James E. Thornton and Ernest J. Hood. The SET output line 40 of flip-flop 24 is connected to one input terminal of an AND gate 42. The CLEAR output line 44 serves as one input to an AND gate 46. To output line 30 from logic level translator 28 is connected an inverter 48. The output line 50 from this inverter is joined to second input terminals of AND gates 42 and 46 respectively. The output line 52 of AND gate 42 serves as the SET input line of a second flip-flop 54. Output line 56 from AND gate 46 constitutes the CLEAR input line to flip-flop 54. Flip-flop 54 is the same type as flip-flop 24, having a pair of inverters 58 and 60 with cross-coupled feedback paths. To the SET output line 62 of the flip-flop is joined line 64 to connect the flip-flop SET output to a second input terminal of AND gate 32. Line 62 is also connected to the input terminal of AND gate 66. To the second input of AND gate 66 is connected via line 68 the output of logic level translator 28. The output of AND gate 66 is joined by line 70 to a logic level translator 72 which changes the internal logic levels of the resynchronizing circuit back to the external digital logic of the computer, the output of translator 72 representing the input signal resynchronized to the computer clock.

Figure 3:
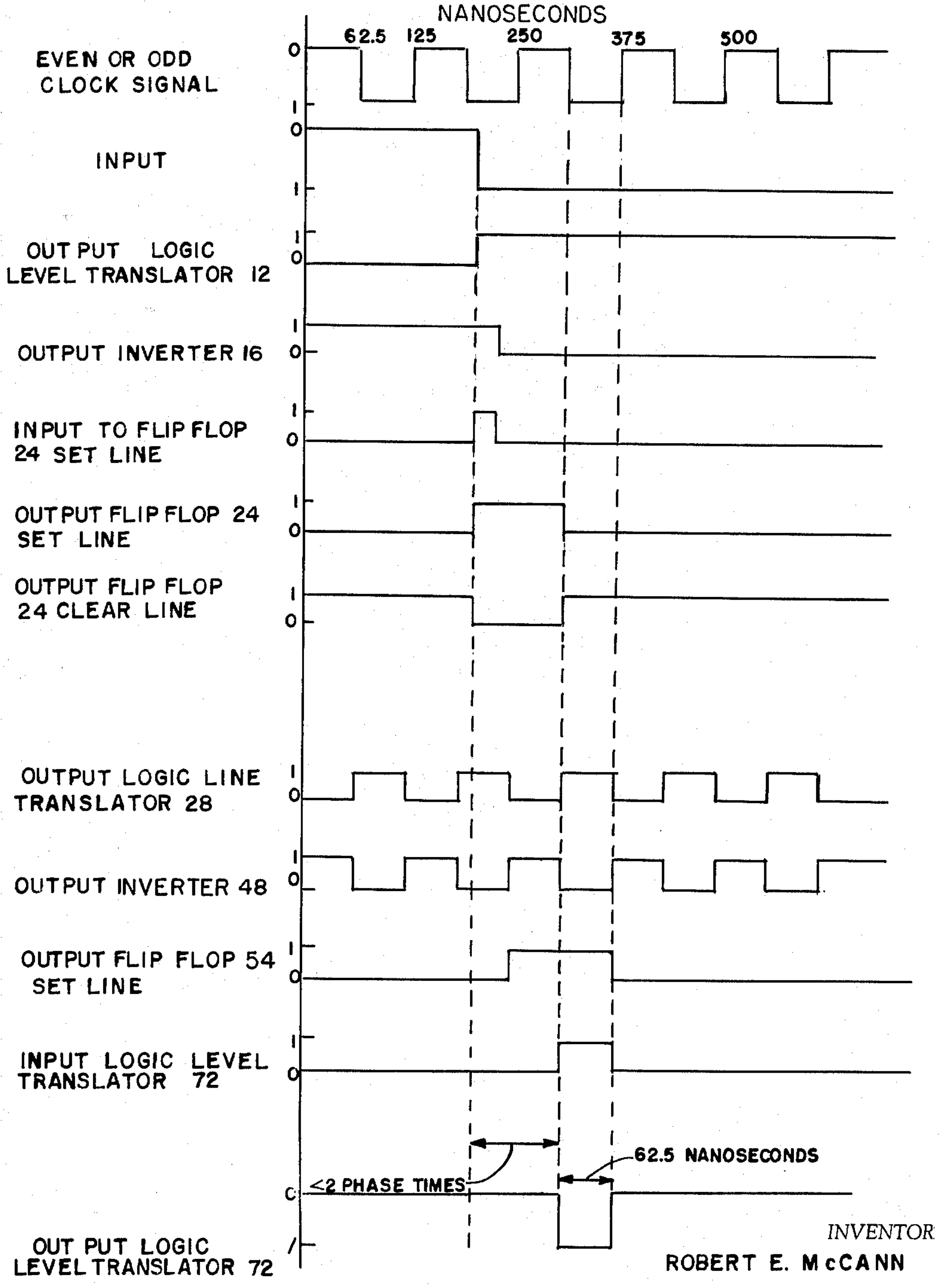
FIGURE 3 is a timing diagram illustrating operation of the system when the input data signal is unfavorably timed thereby preventing the input from being resolved within one phase time.
Figure 4:
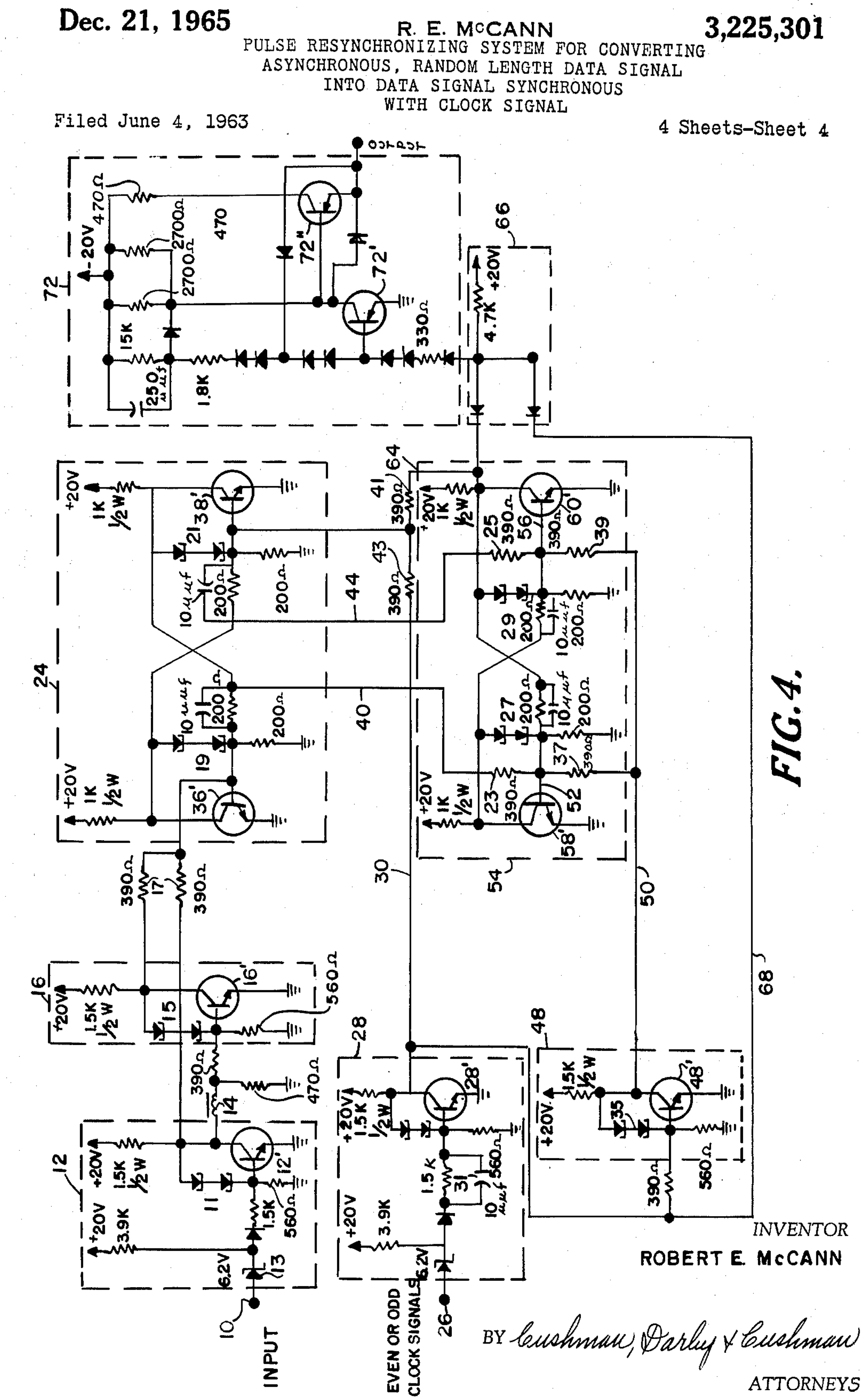
FIGURE 4 is a schematic diagram of a preferred circuit embodiment corresponding to the block diagram of FIGURE 1.

With the schematic block diagram of the resynchronizing circuit now fully set forth, its operation will be described in detail. To assist in illustrating the operation, the timing diagrams of FIGURES 2 and 3 will be utilized. For purposes of illustration, it will be assumed that the external digital logic levels of the asynchronous input signal and the clock signals are −1.1 volts for a logical "0" and −5.8 volts for a logical "1," and that the internal logic levels of the resynchronizing circuit are +0.7 volt for a logical "0" and +1.7 volts for a logical "1." Although this system resynchronizes asynchronous signals of random length, the length of the input signals must be greater than the delay time of delay line 14, the delay time being chosen to develop a pulse of sufficient length to positively set flip-flop 24 as will be described. In the example set forth, the clock signals have a phase time of 62.5 nanoseconds and the delay of line 14 is approximately 25 nanoseconds. For clarity the elements of the circuit will be described as operating instantaneously rather than having inherent delays. However, it should here be noted that the precise circuitry to be described hereinafter with respect to FIGURE 4 is so designed as to take these inherent delays into account while maintaining the same basic operation which will now be outlined.

Under initial conditions it is assumed that flip-flops 24 and 54 are in their CLEARED state and a logical "0" is continuously applied to input terminal 10 of the resynchronizing circuit. The logic level translator 12 converts the −1.1 volt logical "0" to a +0.7 volt logical "0" for use by the resynchronizing circuit. This logical "0" prevents the gating of the "1" at the output line of inverter 16 and thereby prevents flip-flop 24 from being SET. The "0" on the SET output line 40 of flip-flop 24 also prevents SETTING of flip-flop 54 since AND gate 42 cannot be enabled. Similarly, AND gate 66 cannot be conditioned. Therefore, a logical "0" of +0.7 volt is applied to logic level translator 72. The translator reconverts this "0" to a −1.1 volt logical "0" output from the resynchronizing circuit.

The operation of the circuit when a logical "1" is applied to the circuit will now be described. The logic level translator 12 converts the −5.8 volt level of the external "1" to a +1.7 volt "1" for internal use within the resynchronizing circuit. This "1" is applied via line 20 to AND gate 18. Since the delay line 14 prevents the inverter 16 from receiving the "1" for 25 nanoseconds, the inverter output remains at the "1" level due to the "0" at its input. Accordingly, AND gate 18 is conditioned for 25 nanoseconds and a "1" is applied to the SET input line of flip-flop 24 to thereby SET the flip-flop producing a "1" on SET output line 40. In spite of the fact that the pulse on SET input line 22 has a length of only 25 nanoseconds, the flip-flop 24 remains SET until CLEARED by an enabling input to AND gate 32. This cannot occur until the next flip-flop 54 is SET. Simultaneously with the above operations, a clock signal having phase times of 62.5 nanoseconds has been converted to the internal logic levels of the resynchronizing circuit by translator 28. An inevter 48 serves to invert this signal and it is applied via line 50 to AND gates 42 and 46. When a "1" appears on line 50 from the inverter, AND gate 42 is conditioned to place a "1" on the SET input line 52 of flip-flop 54. This produces a "1" on the SET output line 62 of the flip-flop which remains until flip-flop 24 and then flip-flop 54 are CLEARED. The inverter 48 and AND gate 46 insure that flip-flop 54 is not CLEARED until one phase time after flip-flop 24 is CLEARED. A logical "1" clock pulse at the output of logic level translator 28 is directed via lines 30 and 68 to AND gate 66 to pass a 62.5 nanosecond pulse to logic level translator 72 simultaneously with the CLEARING of flip-flop 24 due to the conditioning of AND gate 32. The rapid response of the circuitry and the logical arrangement employed in this system prevent flip-flop 54 from being SET while a logical "1" is applied via line 68 to AND gate 66, which condition would undesirably produce an output pulse of shorter duration than 62.5 nanoseconds.

Figure 2:
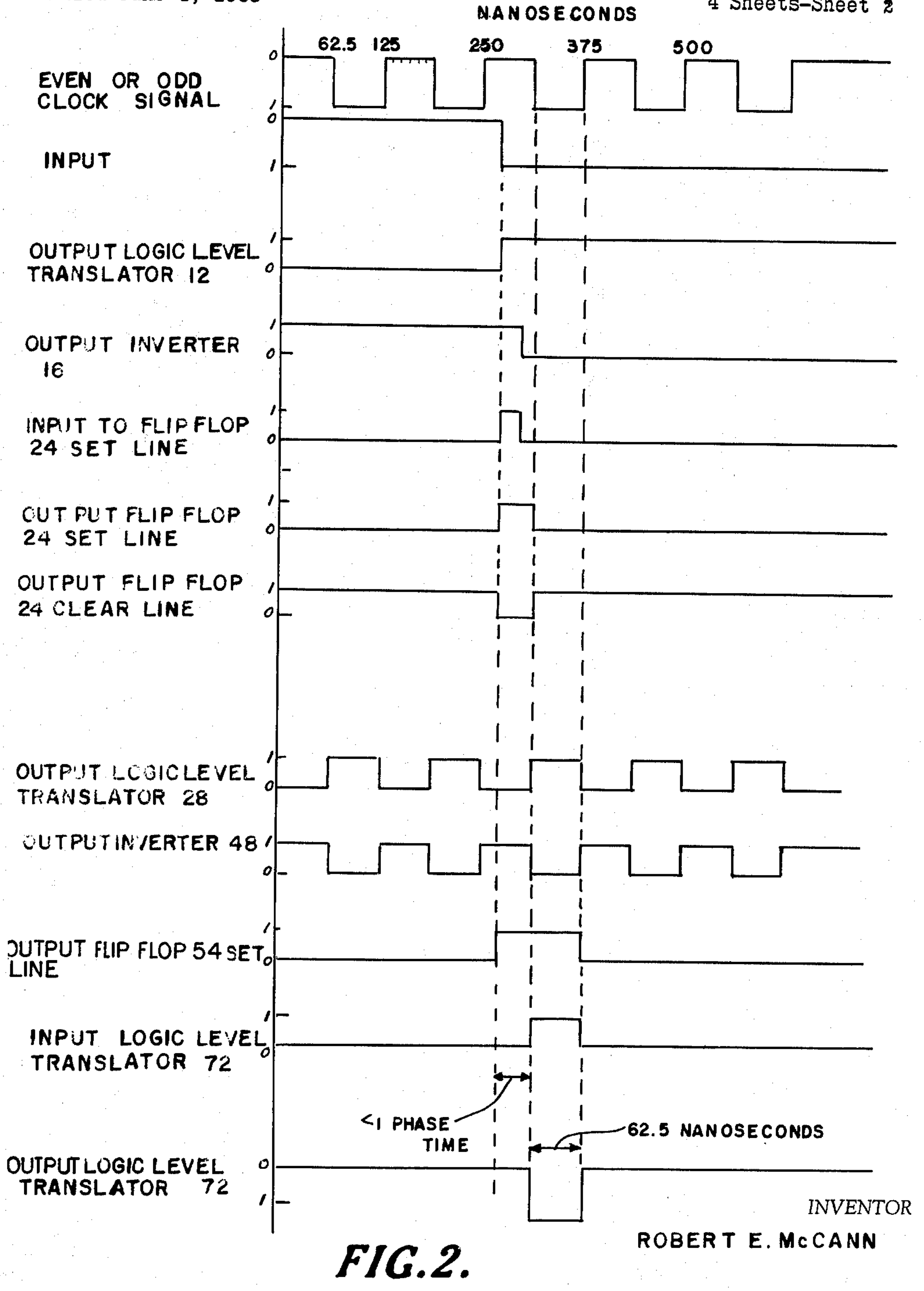
FIGURE 2 is a timing diagram illustrating operation of the system when the input data signal is favorably timed to allow the input to be resolved within one phase time.

Referring to the timing diagrams of FIGURES 2 and 3, typical cycles of operation for the resynchronizing system of FIGURE 1 will be described. FIGURE 2 illustrates a cycle in which the data input signal changes from a logical "0" to a logical "1" at a preferred time allowing the system to resolve the input within one phase time. FIGURE 3, on the other hand, illustrates a cycle of operation which is not optimum in that the input signal is not resolved to produce a synchronized output within a single phase time. However, the example of FIGURE 3 does permit resynchronization of the data signal to occur within a maximum of three phase times, or one and one-half clock cycles.

Referring more specifically to FIGURE 2, there is illustrated a clock signal having a phase time of 62.5 nanoseconds. This clock signal varies in voltage level according to the external logic levels of the computer. These constitute the value of −1.1 volts for a logical "0" and −5.8 volts for a logical "1." An input signal also at the external voltage logic levels of the computer is shown, this signal changing from a logical "0" to a logical "1" shortly after the 250 nanosecond phase time of the clock signal begins. The output logic level translator 12 converts this input signal to the internal logic levels of the resynchronizing circuit. These levels constitute a +0.7 volt for a logical "0" and +1.7 volts for a logical "1." Since, for the purposes of illustration, it is assumed that each of the elements of the circuit operate instantaneously, the change from a "0" to a "1" of the external input signal corresponds in time with the change of this signal after it has been converted by the logic level translator 12. Due to the delay of approximately 25 nanoseconds imposed by delay line 14, the output of inverter 16 remains a logical "1" for approximately 25 nanoseconds after the changing of the input signal from a "0" to a "1." This results in the enabling of AND gate 18 to produce a 25 nanosecond input pulse to the SET line of flip-flop 24 thereby SETTING the output SET line of this flip-flop. At the time that flip-flop 24 is SET, the inverted clock signal, which has been converted to the internal logical level of the resynchronizing circuit by logic level translator 28, is a logical '1" thereby immediately enabling AND gate 42 to SET flip-flop 54. Carrying through the assumption that the elements of the circuit operate instantaneously, flip-flop 54 is SET simltaneously in point of time with the change of the input signal from a "0" to a "1." Before the output on the SET line of flip-flop 54 can be gated out of the resynchronizing circuit, it must await a logical "1" clock pulse. Since the SETTING of flip-flop 54 ocurred during a logical "0" phase time of the clock, a logical "1" clock signal is presented to AND gate 66 within one phase time. When gate 66 is conditioned, the logic level translator 72 converts the logical "1" to the external computer logic level. Utilizing the circuitry to be hereinafter described with reference to FIGURE 4, the operation of the logic level translators and the inverters is sufficiently fast so as not to destroy the phase time relationship between the input signal and the resolution of this signal into a synchronized output within one phase time.

FIGURE 3 illustrates the timing when an input signal changes from a "0" to a "1" at a time such that the circuit cannot resolve the change within one phase time. The example illustrated indicates a condition which approximates the slowest response of the circuit to the input. The change of the input signal from a "0" to a "1" occurs slightly after the 187.5 nanosecond time when the clock signal, as shown, is at the voltage level of a logical "1." Under these conditions the flip-flop 24 is SET in exactly the same manner as described with reference to FIGURE 2. However, when the output SET line of the flip-flop 24 changes from "0" to "1," the output of inverter 48 which gates a "1" output on the SET line to flip-flop 54 is a "0." Accordingly, the system must wait for inverter 48 until it switches from a "0" to a "1" at which time the flip-flop 54 is SET. Before information on the output SET line of flip-flop 54 can be gated to the output of the resynchronization circuit, the system must wait an entire phase time for the output of logic level translator 28 to rise from a "0" to a "1." When this transition occurs, the output on the SET line of the flip-flop 54 is gated to produce a 62.5 nanosecond logical "1" output. As can be seen in FIGURE 3, the system is unable to resolve the input signal for almost two phase times. Considering the inherent delays in the actual operation of the circuitry, this time of resolution may be caused to extend beyond two phase times. However, the circuitry is so designed that resynchronization of the input data signal does not exceed a maximum of three phase times.

Now that the logical operation of the resynchronizing system has been described and illustrated by the timing diagrams, a preferred circuitry arranged in the logical configuration of FIGURE 1 will be set forth with reference to FIGURE 4. The values of the components illustrated have been selected for a system in which the external logical levels are −1.1 volts for a logical "0" and −5.8 volts for a logical "1" and the internal logic levels are +0.7 volt for a logical "0" and +1.7 volts for a logical "1." To the input terminal 10 is connected the logical level translator 12 which comprises basically a NPN type transistor 12′ having a series arrangement of a pair of tunnel diodes 11 connected between its base and collector, the base of transistor 12′ being connected to terminal 10 through a diode system including a zener diode 13. The collector of transistor 12′ is connected through a delay line 14 to the base of NPN type transistor 16′ which comprises the basic element of inverter 16. The delay time of the delay line 14 is chosen as approximately 25 nanoseconds in order to insure that the pulse developed to SET flip-flop 24, in the manner heretofore described, is of sufficent length to allow the flip-flop to stabilize itself. Just as in translator 12, the NPN transistor of inverter 16 includes a pair of tunnel diodes 15 between its base and collector. The collectors of both transistors 12′ and 16′ are connected through identical resistors 17 to the base of NPN transistor 36′ which constitutes one principal portion of the bistable multivibrator, or flip-flop, 24. Between the collector and base of transistor 36′ is connected a pair of tunnel diodes 19. The voltage level created at the base of transistor 36′ due to the outputs of transistors 12′ and 16′ through their associated resistors 17 cooperates with the action of tunnel diodes 19 to perform the ANDing function of gate 18 of the logic diagram. The AND function will hereinafter be described in greater detail. Transistor 38′, of the NPN type, provided with tunnel diodes 21 between its collector and base constitutes the other principal portion of flip-flop 24. Transistors 36′ and 38′ are components of two inverter circuits provided with cross-coupled feedback from collector to base to constitute the flip-flop 24, a bistable circuit capable of storing information. The SET output line 40 from flip-flop 24 is applied through a resistor 23 to the base of transistor 58′ constituting one inverter portion of flip-flop 54. The CLEAR output line 44 from flip-flop 24 is connected through resistor 25 to the base of the other inverter portion 60′ of flip-flop 54, the portions 58′ and 60′ constituting NPN type transistors. These transistors also have pairs of tunnel diodes 27 and 29 respectively connected between their collectors and bases. To a terminal 26 to which the clock signals are applied, there is joined a logic level transistor 28 which is practically identical to translator 12 previously described. A NPN type transistor 28′ constitutes the principal portion of this translator. The only difference between translators 12 and 28 is the employment of a speedup capacitor 31 in the base circuit of transistor 28′. The output of translator 28 is connected to inverter 48 having a NPN transistor 48′ as the principal component thereof. A pair of tunnel diodes 35 is connected between the base and collector of this transistor. The output of inverter 48 is applied via line 50 through resistors 37 and 39 respectively to the bases of transistors 58′ and 60′ of flip-flop 54. In the same manner as described previously, the voltage level at the junctions of resistors 23 and 37 combines with the operation of tunnel diodes 27 to perform the AND function corresponding to gate 42 illustrated in the logic diagram of FIGURE 1. Similarly, the voltage level at the junction of resistors 25 and 39 at the base of transistor 60′ functions with tunnel diodes 29 to control the ANDing corresponding to gate 46 of FIGURE 1. The SET output of flip-flop 54 is connected by line 64 through resistor 41 to the base of transistor 38′ of flip-flop 24. Similarly, the output of logic level translator 28 is connected via line 30 through resistor 43 to the same point. Therefore, the voltage level at the junctions of resistors 41 and 43 at the base of transistor 38′ cooperates with the tunnel diodes 21 to produce the AND function performed by gate 32 shown in the logic diagram of FIGURE 1. The output from the collector of transistor 60′ of flip-flop 54 and from logic level translator 28 is applied through a positive AND circuit 66 to the input of a logical level translator 72. This logic level translator 72 serves as a bi-level inverter and comprises basically a pair of PNP type transistors 72′ and 72″ provided with diode feedback paths. This circuit is fully described in the copending application of Leo F. Slattery entitled "Bi-Level Inverter Circuit," filed concurrently herewith.

Except for the transistors utilized in the outlet logic level translator 72, all of the transistors employed in the resynchronizing circuit are of high speed silicon NPN type having a gain-bandwidth of 1 kmc., which provides a time per inversion of approximately 4 nanoseconds as used in this circuit. The tunnel diode network employed with each of the NPN transistors establishes an input threshold level and holds the output voltage at the sum of the tunnel diode drops and the base-emitter junction drop. The tunnel diodes are of the axial type having a peak current of 1 ma. and a forward voltage of 500 mv. Since each network includes two tunnel diodes in series, the diodes ideally switch at 1 ma. with a composite forward voltage of 1 volt. Although no two tunnel diodes switch at exactly the same point, the difference between diodes is negligible in this high speed circuit.

Logic level translators 12 and 28 perform the function of changing a −5.8 volt logical "1" to a +1.7 volt logical "1" and a −1.1 volt logical "0" to a +0.7 volt logical "0." Upon receipt of a −1.1 volt "0" input, the tunnel diodes will be driven in the reverse direction and they will be in the low voltage state. Since the transistors are conducting due to the conventional biasing means, the collector potential is held at the base potential which is approximately +0.7 volt since the transistors have their emitters grounded. However, on receipt of a −5.8 volt input, the 6.2 volt drop across the zener diode causes the tunnel diode current to be forwardly driven to increase to approximately 1.2 ma. so that the diodes switch to their high voltage state. This causes transistor conduction to decrease and the collector voltage becomes equal to the sum of the tunnel diode voltages and the base-emitter voltage, a total of +1.7 volts. The inverter circuits throughout the resynchronizing system change a +1.7 volt "1" input to a +0.7 "0" output and vice-versa. Again, the output levels are taken from the collector and the collector potential is equal to the sum of the tunnel diode voltages plus the base to emitter voltage of the silicon transistor. The time required for a transition from one state to the other is approximately 4 nanoseconds.

To describe the several AND functions of the system in greater detail, reference is made to the arrangement employed in driving the base of transistor 36′ which constitutes a principal portion of flip-flop 24. When logical "0's" are present at the collectors of transistors 12′ and 16′, or when one but not both of the collectors has a voltage level of +1.7 volts corresponding to a logical "1," the system is considered to be at its quiescent state during which tunnel diodes 19 are forward biased and transistor 36′ is conducting to produce a collector voltage thereon of +1.7 volts. However, when logical "1's" are present on the collectors of both transistors 12′ and 16′, the resistors 17 produce a voltage level at the base of transistor 36′ driving in reverse the tunnel diodes and allowing conduction of transistor 36′ to increase thereby dropping its collector voltage to +0.7 volt corresponding to a logical "0." By the proper choice of circuit parameters the tunnel diodes are driven in reverse only when both inputs via resistors 17 to the SET input line of flip-flop 24 are logical "1's." Therefore, an AND function is performed. The remaining AND arrangements of the system, except for diode AND gate 66, are formed by similar circuits.

The output logic level translator 72 converts a +0.7 volt logical "0" input to a −1.1 volt logical "0" output, and a +1.7 volt logical "1" input to a −5.8 volt logical "1" output.

Utilizing the circuitry just described which operates on the logical principles described with reference to FIG- URES 1 through 3, an improved resynchronization system is provided which operates at faster speeds than building blocks of the data processing system in which such a resynchronizing system may be employed. By such an arrangement, a random length asynchronous data input signal may be converted to synchronization with a computer clock signal, the only requirement of the length of the asynchronous signal being that it be longer than the delay time of the delay line utilized in the resynchronizing system. In operation, the output from the resynchronizing system remains at the external "0" logic level of the computer until such time as an input logical "1" is applied to the system. At this time, the resynchronizing arrangement produces a logical "1" output having the same length as the phase time of the computer clock.

The above described embodiment is illustrative of a preferred embodiment of the invention but is not intended to limit the possibilities of insuring a high speed resynchronization system which resolves an input data signal within a maximum of one and one-half clock cycles. The logical and electrical designs disclosed herein are examples of systems in which the inventive features of this disclosure may be utilized, and it will become apparent to one skilled in the art that certain modifications may be made within the spirit of the invention as defined by the appended claims.

What is claimed is:

1. A resynchronizing system for converting an asynchronous random length data input signal to a data processing machine into an output data signal synchronous with a clock signal employed in said machine comprising bistable means, means for SETTING said bistable means in response to said asynchronous random length data input signal, said SETTING means including a delay device and a gating arrangement to which said data input signal is applied to produce a pulse having a length approximating that of said delay device, and connecting means for applying said pulse to the bistable means; and means responsive to the SET output of said bistable means and said clock signal to produce an output data signal synchronous with said clock signal.

2. A resynchronizing system as set forth in claim 1 wherein said bistable means comprises a pair of flip-flops, the first of said flip-flops being SET in response to said random length data input signal; means for inverting said clock signal, and means responsive to the SET output of said first flip-flop and an inverted clock signal for SETTING the second of said flip-flops.

3. A resynchronizing system as set forth in claim 2 further comprising an AND gate having two input terminals, the SET output of the second of said flip-flops connected to one of said input terminals and said clock signal joined to the other of said input terminals wherein said AND gate is conditioned to produce an output data signal synchronous with said clock signal.

4 A resynchronizing system as set forth in claim 3 further comprising means for CLEARING said first flip-flop simultaneously with the conditioning of said AND gate.

5. A resynchronizing system as set forth in claim 4 further including means for CLEARING said second flip-flop before said AND gate can again be conditioned.

6. A resynchronizing system for converting an asynchronous random length data input signal to data processing machine into an output data signal synchronous with a clock signal employed in said machine comprising a first AND gate having a pair of input terminals, a line connecting said random length data input signal to one of said input terminals, and means including a delay line and an inverter in series connecting said random length data input signal to the other of said AND gate input terminals wherein said first AND gate is conditioned on the application of a random length data input signal to produce an output pulse from said AND gate having a length approximating that of said delay line; a first flip-flop having SET and CLEAR input lines and SET and CLEAR output lines, means connecting the output of said first AND gate to said SET input line of the first flip-flop; second and third AND gates each having a pair of input terminals, means connecting the SET output line of said first flip-flop to one input terminal of said second AND gate and means connecting the CLEAR output line of said first flip-flop to one input terminal of said third AND gate; means for inverting said clock signal, and connecting means joining the output of said inverting means to the second input terminals of said second and third AND gates; a second flip-flop having SET and CLEAR input lines and a SET output line, the SET input line of said second flip-flop connected to the output of said second AND gate and the CLEAR input line of said third flip-flop connected to the output of said third AND gate; a fourth AND gate having a pair of input terminals, one of said terminals being connected to the SET output line of said second flip-flop and means connecting said clock signal to the second of the input terminals of said fourth AND gate, and an output line from said fourth AND gate for said synchronized data signals; a fifth AND gate having a pair of input terminals, means for connecting said clock signal to one of said terminals and means for joining the SET output line of said second flip-flop to the other of said input terminals of said fifth AND gate; and means connecting the output of said fifth AND gate to the CLEAR input line of said first flip-flop.

7. A resynchronizing system for converting an asynchronous random length data input signal to a data processing machine into an output data signal synchronous with a clock signal employed in said machine comprising: bistable means; means for SETTING said bistable means in response to said asynchronous random length data input signal, said means for SETTING said bistable means including an AND gate having a pair of input terminals, a line connecting said random length data input signal to one of said input terminals, means including a delay line and an inverter in series connecting said random length data input signal to the other of said AND gate input terminals wherein said AND gate is conditioned on the application of a random length data input signal to produce an output pulse from said AND gate having a length approximating that of said delay line, and means for connecting said pulse to said bistable means; and means responsive to the SET output of said bistable means and said clock signal to produce an output data signal synchronous with said clock signal.

References Cited by the Examiner

UNITED STATES PATENTS

| | | | |
|---|---|---|---|
| 2,981,853 | 4/1961 | Meyer | 307—88.5 |
| 3,110,866 | 11/1963 | Maure et al. | 328—110 |
| 3,167,716 | 1/1965 | Williams et al. | 328—63 |

OTHER REFERENCES

IBM Technical Disclosure Bulletin, "A Simple Synchronizing Circuit," by McGuire, vol. 3, No. 6, page 19, dated February 1961.

ARTHUR GAUSS, *Primary Examiner.*